United States Patent
Aoun et al.

(10) Patent No.: US 7,386,604 B1
(45) Date of Patent: Jun. 10, 2008

(54) SIGNALING METHOD FOR COMMUNICATION NETWORKS

(75) Inventors: Cedric Aoun, Boulogne Billancourt (FR); Chris Simcoe, Maidenhead (GB); Julian Mitchell, Maidenhead (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 775 days.

(21) Appl. No.: 10/361,229

(22) Filed: Feb. 10, 2003

(51) Int. Cl.
G06F 15/177 (2006.01)

(52) U.S. Cl. ............... 709/220; 709/249; 370/254; 370/259

(58) Field of Classification Search ............... 709/220, 709/249; 370/254, 259
See application file for complete search history.

(56) References Cited

U.S. PATENT DOCUMENTS

| | | | | |
|---|---|---|---|---|
| 5,909,441 A | * | 6/1999 | Alexander et al. | 370/395.54 |
| 6,104,718 A | * | 8/2000 | Christie | 370/410 |
| 6,314,175 B1 | * | 11/2001 | Jones | 379/229 |
| 6,606,321 B1 | * | 8/2003 | Natanson et al. | 370/395.2 |
| 6,658,001 B1 | * | 12/2003 | Furuno et al. | 370/392 |
| 2003/0031192 A1 | * | 2/2003 | Furuno | 370/409 |
| 2004/0091264 A1 | * | 5/2004 | Beshai | 398/47 |
| 2004/0131051 A1 | * | 7/2004 | Rabipour et al. | 370/352 |

* cited by examiner

Primary Examiner—Philip Tran
Assistant Examiner—Thuong (Tina) T Nguyen
(74) Attorney, Agent, or Firm—Barnes & Thornburg LLP

(57) ABSTRACT

A signaling method for use in a communication network, in particular a unified network, for supporting a communication along a communication path (12) via a plurality of in-path network infrastructure elements (6, 8, 10) of the network. A service element (26, 28) of the network which is located off the communication path triggers an in-path network infrastructure element (6) and the triggered in-path network infrastructure element initiates in-path signaling along the communication path. In particular, the service element may send a message to a terminating end point of the communication, which message is intercepted by the network infrastructure element (6) closest to the terminating end point, which closest network infrastructure element initiates the in-path signaling.

23 Claims, 5 Drawing Sheets

SIGNALING METHOD FOR COMMUNICATION NETWORKS

FIELD OF THE INVENTION

This invention relates to a method in a communication network, in particular a unified communication network, for providing signaling for requesting network services and/or resource from network infrastructure and to a network operating such a signaling method.

BACKGROUND OF THE INVENTION

The term unified network is used herein to describe a network comprising a plurality of interfaced networks. The unified network may include an internet, which may be a public or private network, and a plurality of other networks connected to each other via the internet. As an example, the unified network shown in FIGS. 1 and 2 includes a public network, eg. public internet (16), and one or more local or private networks, eg. intranets (18, 20, 22), with which the public network is interfaced. The private networks may be operated by small/medium enterprises, such as companies or academic institutions. In such unified networks, communications are made which cross boundaries between different networks. For example, a communication may be made between the different private networks (eg, between intranet (18) and intranet (20)) via a public network (eg. internet (16)) across the boundaries between the public and private networks. The communications are made between application aware devices which may be small end user gateways (4) or user equipments (2, 24), such as telephone devices, computing devices, video conferencing devices, etc. In order to support certain classes of communications between application aware devices across boundaries between different networks, signaling requests may need to be made requesting services from network infrastructure elements (6 to 10) in the communication path. The network infrastructure elements (6 to 10) may be routers or switches with inbuilt processing capabilities for provisioning the network services.

The private networks (18, 20, 22) may operate different applications from each other, for example for handling media transfer, and are likely to operate different applications from those, such as Internet Protocol (IP) used for handling media transport over the public network (16). In order that a communication can be made between networks, the network infrastructure elements at the boundaries of the networks, for example, elements (7, 8, 9 and 10) which interface a private network with the public network may have Network Address Translator (NAT) application software installed on them. In addition the network infrastructure elements located at the boundaries may also have Firewall application software installed on them for security purposes. For example, a firewall application can be used to ensure that only media having a network address known to the firewall application can enter the private network. Therefore, in a unified network the application aware devices terminating a communication path from a first network to a second network via a network boundary will not necessarily have an awareness of the intermediate network infrastructure elements over which the communication is to be carried.

This can mean that certain applications supported by the application aware devices will not work over such a communication path. As an example, the NAT application has the effect of interrupting communications for traffic types which include network address and transport port information in their payload, where this information is specific to a particular private network and so is not recognisable on other networks. Traffic types which might be interrupted by a NATs application include:

Voice over Internet (VoIP) control and peer messages (eg. ITU standard H284, Media Gateway Control Protocol (MGCP), ITU standard H323 and Session Initiation Protocol (SIP));

device management and administration protocols (eg. Simple Network Management Protocol (SNMP));

File Transfer Protocol (FTP) in certain cases;

VoIP quality report messages (RTCP);

Trivial File Transfer Protocol (TFTP) and

Domain Name System (DNS) protocol.

In addition, automatic configuration servers (eg. operating using the Dynamic Host Configuration Protocol (DHCP)) may not operate when the servers are in the public network.

If such applications are to operate effectively over a unified network they need to be provided with certain network services. The type of services that need to be requested from the network infrastructure elements may include:

Pinhole opening, in particular packet filters need to be configured correctly to allow media flow traversal;

Bandwidth reservation, in particular for VoIP adequate bandwidth needs to be provided to support an acceptable voice quality; and/or Network address translation. NATs is needed to provide addresses and ports in order to support proper reachability information to a remote application aware device in a different network.

One signaling method for allocating network services which can be used is in-path signaling, as shown in FIG. 2. In accordance with in-path signaling, the terminating end points (2, 4) of a communication across the unified network themselves request the required network services required to support the communication from network infrastructure elements (6, 8, 10) along the communication path (12). The requests for services from the terminating end points travel along the communication path as shown by dotted line (14). This ensures that the resource allocated in response to the request for network services is provided along the communication path (12). A disadvantage with in-path signaling is that the terminating end points (2, 4) must have the capability of making the network service requests from infrastructure elements (6, 8, 10) along the communication path (12). This normally requires software to be implemented on the terminating end points, which can be costly, especially where the application aware devices (2, 4, 24) forming the terminal end points are already deployed in customer premises.

An alternative signaling method for allocating network services which can be used is off-path signaling, as shown in FIG. 3. In this case application servers or proxies (26, 28) located off a communications path (12) between terminating end points (2, 4) request the required network services required to support the communication on behalf of the terminating end points of the communication path. The application servers or proxies are control devices deployed on a network for providing the application aware devices (2, 4, 24) with a service, such as a voice service or a video service. For example, the application server (26, 28) may be a VoIP call agent for providing application aware devices with a voice service. However, where there are alternate communication paths across the network between terminating end points (for example a path via infrastructure elements (6, 7, 9) is an alternative to the communication path

(12) via infrastructure elements (6, 8, 10)), the application servers or proxies (26, 28) may request network services from network infrastructure which is not on the actual communication path between the terminal end points. For example, application server or proxy (26) may incorrectly request resource from infrastructure (7) and application server or proxy (28) may incorrectly request resource from infrastructure (9). In this case the resource allocated in response to the requests for network services may not be resource on the communication path (12) with the result that there is insufficient resource on the communication path (12) to support the communication. Alternatively, the application servers or proxies (26, 28) may request network services from the infrastructure element on all possible communication paths between the terminating end points which is costly in terms of wasted resource. These problems become highly significant in complex networks or networks where dynamic changes are occurring.

SUMMARY OF THE INVENTION

The present invention relates generally to a network infrastructure element initiating in-path signaling along a communication path of a communication to be carried by the infrastructure element in response to a trigger from an off-path service element of the network.

In accordance with a first aspect of the invention there is provided a signaling method for use in a communication network for supporting a communication along a communication path (12) via a plurality of in-path network infrastructure elements of the network, comprising the steps of:

a service element of the network located off the communication path triggering an in-path network infrastructure element; and the triggered in-path network infrastructure element initiating in-path signaling along the communication path.

According to a second aspect of the present invention, there is provided a communication network comprising:

a plurality of network infrastructure elements for carrying a communication along a communication path across the network which infrastructure elements comprise means for initiating in-path signaling along the communication path; and a service element of the network located off the communication path for triggering an in-path network infrastructure element to initiate in-path signaling along the communication path.

The method and network according to the present invention has all of the advantages of in-path signaling, but does not suffer from the disadvantage of the terminating end systems of the network carrying out in-path signaling operations. Instead, the in-path signaling is conducted by the network infrastructure element on which it is much more efficient to install the in-path signaling application software.

These advantages can be achieved by the installation of computer readable media onto network infrastructure elements of the network, in accordance with a third aspect of the present invention. According to a third aspect of the present invention there is provided such computer readable media, for carrying out the following operations:

intercepting a triggering message relating to a communication to be carried by the infrastructure element from a service element of the network; and in response to the triggering message, initiating in-path signaling along a communication path of the communication.

In order to achieve the advantages of the present invention, as set out above, network infrastructure elements according to a fourth aspect of the present invention can be deployed in a network. According to a fourth aspect of the present invention there is provided a such network infrastructure element for carrying a communication along a communication path across the network and comprising:

means for intercepting a triggering message from a service element of the network located off the communication path;

means responsive to the triggering message for initiating in-path signaling along the communication path.

The communication may be between a first terminal element located in a first sub-network of a unified network and a second terminal element located in a second sub-network of a unified network and the network may be a unified communication network which comprises a public network interfaced with at least one private network.

In one embodiment of the present invention, the communication terminates at a network terminal device and the in-path network infrastructure element which is the closest such infrastructure element to the network terminal device on the network is triggered. To achieve this, the computer readable media according to the third aspect of the present invention may carry out the step of intercepting the message from the service element to a network terminal device which terminates the communication if the network infrastructure element is the closest such infrastructure element to the terminal device. Similarly, the network infrastructure element according to the fourth aspect of the present invention may include means for intercepting the message if the network infrastructure element is the closest in-path infrastructure element to the network terminal device on the network.

The triggering of the network infrastructure element can be achieved by the sending of a signaling message by the service element to a network terminal device which terminates the communication and the in-path infrastructure element, which may be the closest one to the network terminal device, intercepting the signaling message.

The triggering message may contain the identification of the service element which sent it and the in-path infrastructure element intercepting the message may authenticate the service element identification and if the authentication is successful, initiate in-path signaling along the communication path. This authentication procedure ensures that the service element is authorised to request services and/or resource from the infrastructure elements in accordance with the policies of the network. This can be achieved by installing computer readable media according to the third aspect of the present invention on the infrastructure elements of the network, which can carrying out the steps of:

intercepting a triggering message from a service element of the network which message identifies the service element;

analyzing the triggering message to authenticate the service element identification, and if the authentication is successful, initiating in-path signaling along the communication path.

The network infrastructure elements may be switches or routers on which is installed network service applications and/or an in-path signaling application, such as the computer readable media according to the third aspect of the present invention. The service element may be an element for providing a communication service, such as a voice service or a video service to one or more network terminal devices of the network. The network terminal device at which the communication terminates may be an application aware device, for example a small intelligent gateway device, a telephone device, a computing device or a video conferencing device.

The triggering or signaling message sent by the service element may contain information specifying the network services and/or resources required along the communication path to support the communication.

Other aspects and features of the present invention will become apparent to those ordinarily skilled in the art upon review of the of the following description of specific embodiments of the invention in conjunction with the accompanying Figures.

BRIEF DESCRIPTION OF THE DRAWINGS

In order that the present invention is more fully understood and to show how the same may be carried into effect, reference shall now be made, by way of example only, to the Figures as shown in the accompanying drawing sheets, wherein.

DETAILED DESCRIPTION OF PREFERRED EMBODIMENTS

There will now be described by way of example the best mode contemplated by the inventor for carrying out the invention. In the following description, numerous specific details are set out in order to provide a complete understanding of the present invention. It will be apparent, however, to those skilled in the art that the present invention may be put into practice with variations of the specific.

Figure 1:
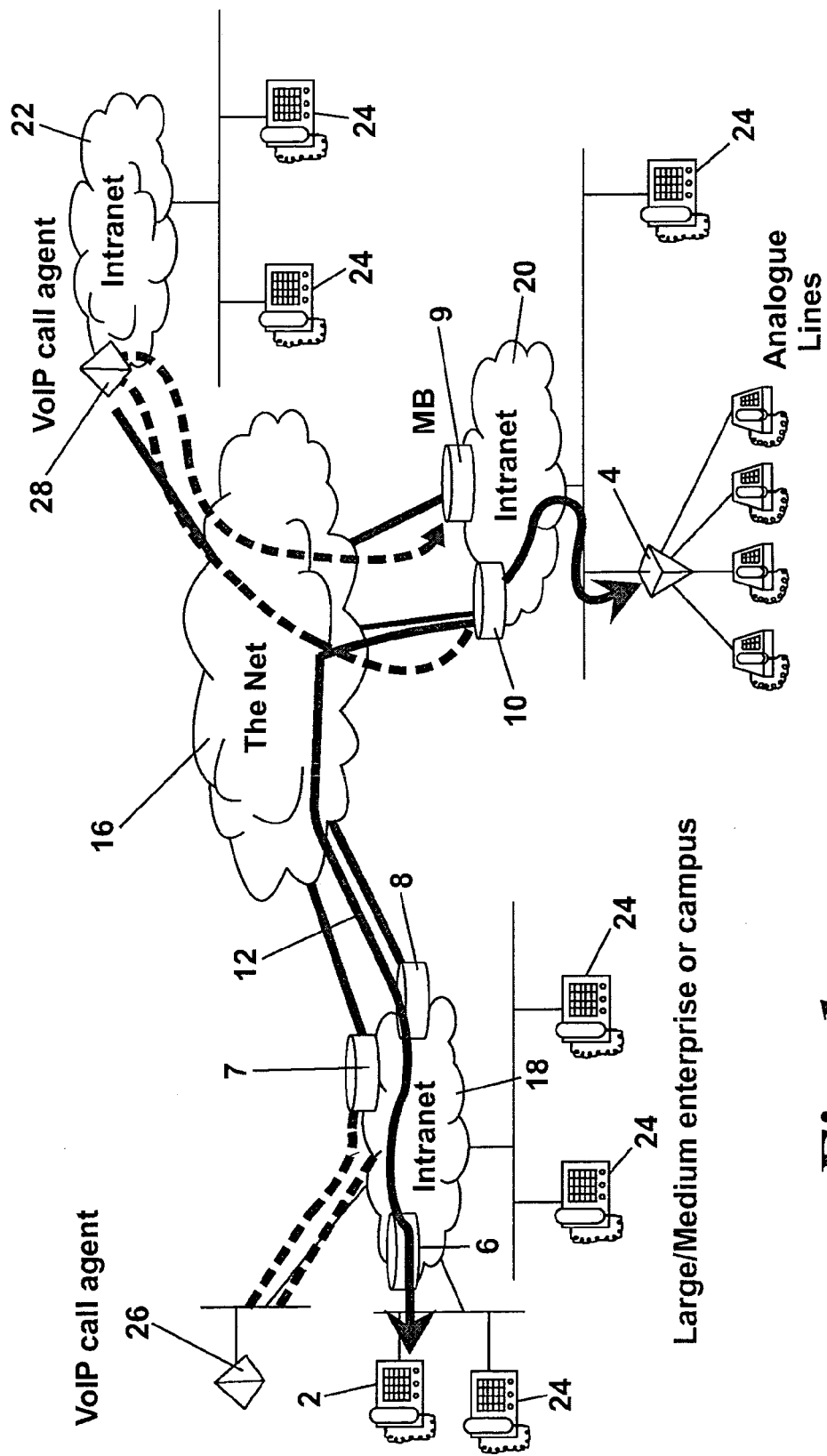
FIG. 1 shows a unified network operating an off-path signaling method.
Figure 2:
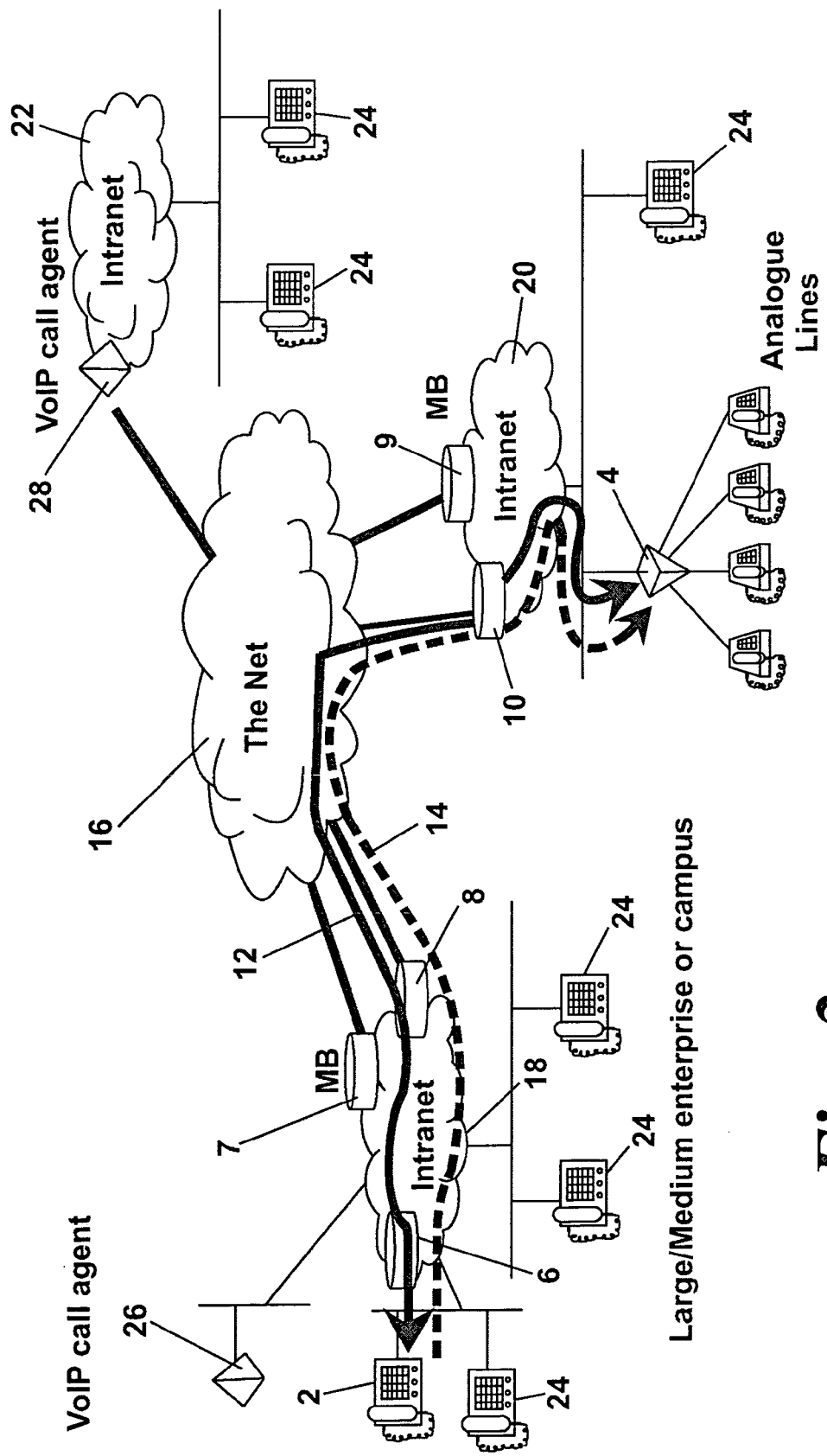
FIG. 2 shows a unified network operating an in-path signaling method.
Figure 3:
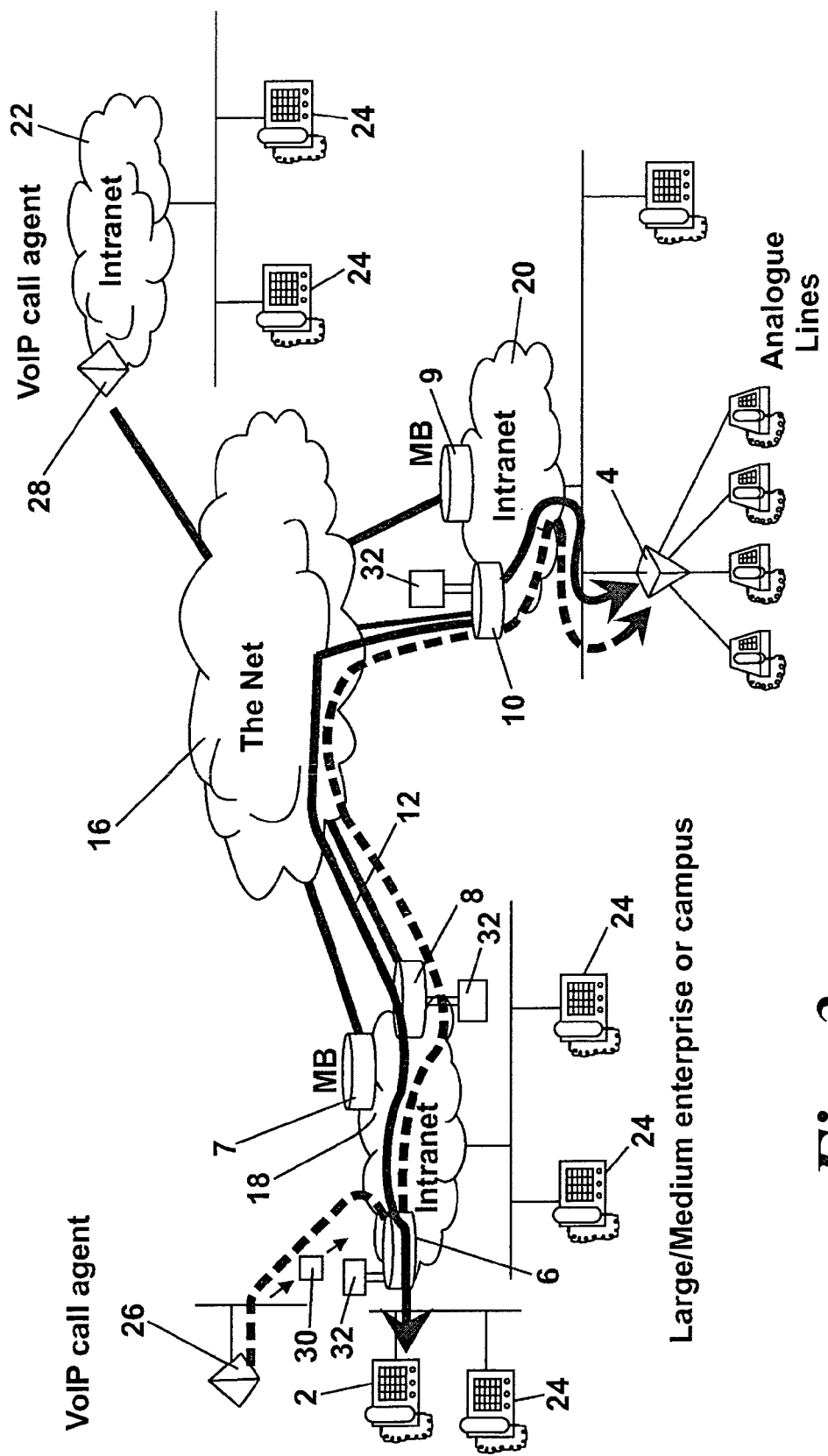
FIG. 3 shows a unified network operating a signaling method according to the present invention.

FIG. 3 shows a unified network comprising a public network, the internet (16) and three private networks, the intranets (18, 20, 22). Each intranet (18, 20, 22) is interfaced with the internet (16). The intranets (18, 20) comprise a plurality of network infrastructure elements (6 to 10), such as switches or routers, connected together by links. The network infrastructure elements may have applications installed on them for provisioning network services. They may also include means, such as an application (32) for initiating and supporting in-path signaling installed on them. The networks (18, 20, 22) may also comprise additional infrastructure elements, but only those with applications installed on them for providing relevant network services are shown in FIG. 3.

A telephone call is initiated by an intelligent gateway (4) to an application aware telephone device (2). The intelligent gateway (4) is located in a first intranet (20) and the telephone device (2) is located in a second intranet (18). Therefore a communication path (12) for the call must extend from the first intranet (20) and across the internet (16) to the second intranet (18). A VoIP call agent (26) located in the second intranet (18) provides voice services to the telephone device (2). The call initiation procedure will involve the sending of a message to the VoIP call agent (26) [Box A of FIG. 4]. In response to this the VoIP call agent (26) generates and sends a signaling protocol message (30) to the telephone device (2) [Box B of FIG. 4]. The signaling protocol message will contain instructions to request the required network services and/or resources required to support the call and an identification of the VoIP call agent (26). The signaling protocol message (30) will specify the resources to be requested from each of the network infrastructure elements along the communication path (12) of the call.

Figure 4:
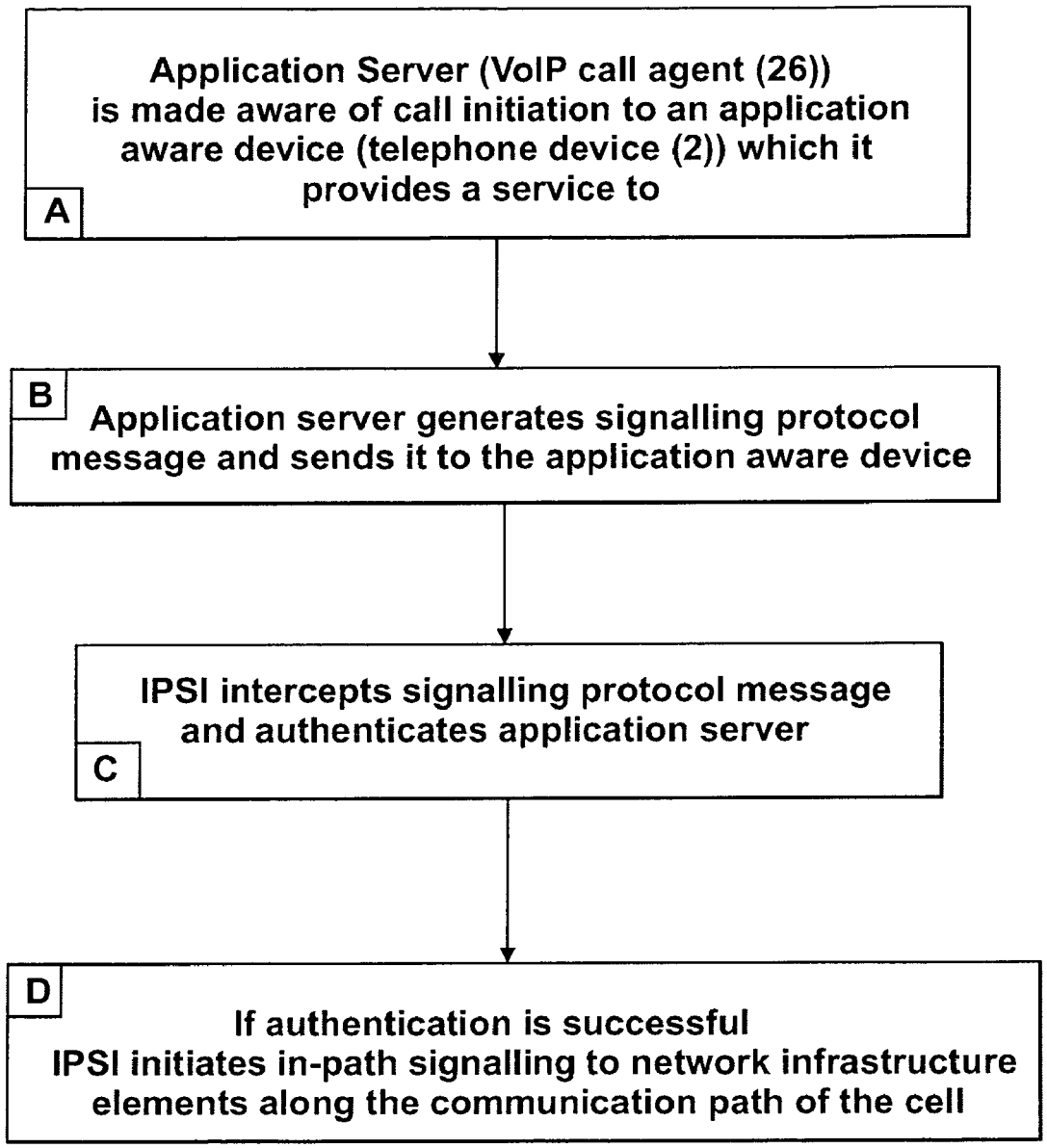
FIG. 4 shows a block diagram representing the steps in the signaling method according to the present invention operated on the unified network of FIG. 3.

The signaling protocol message (30) is intercepted by the network infrastructure element in the communication path (12), which can initiate in-path signaling and which is closest to the telephone device (2) [Box C of FIG. 4]. In the present example, the closest such infrastructure element to the telephone device (2) is the infrastructure element (6). Each network infrastructure element (6 to 10) will have knowledge of all of the application aware devices (2, 4, 24) for which it is the closest infrastructure element. For example, it may store a list of all application aware devices directly connected to it, which is updated when new devices are connected to it and existing devices are disconnected from it. On intercepting the signaling protocol message (30) the closest network infrastructure element (6) initiates in-path signaling along the communication path (12) of the call [Box D of FIG. 4]. The closest network infrastructure element (6), which intercepts the signaling protocol message and initiates in-path signaling is referred to herein as the In-Path signaling Initiator (IPSI). The IPSI (6) has an application (32) installed on it for enabling the IPSI to initiate in-path signaling.

When the IPSI (6) intercepts the signaling protocol message (30) from the VoIP call agent (26) it analyzes the message to authenticate the VoIP call agent (26), ie. it checks that the VoIP call agent (26) is authorised to request network services [Box C of FIG. 4]. If the VoIP call agent (26) is successfully authenticated then the IPSI allocates the services and/or resources requested from it by the VoIP call agent (26) or determines that the services and/or resources cannot be allocated [Box S of FIG. 5]. The IPSI (6) also generates an in-path signaling resource allocation message which is sent sequentially to the infrastructure elements (8, 10) along the communication path (12) of the call [Box D of FIG. 4 and Box T of FIG. 5].

Figure 5:
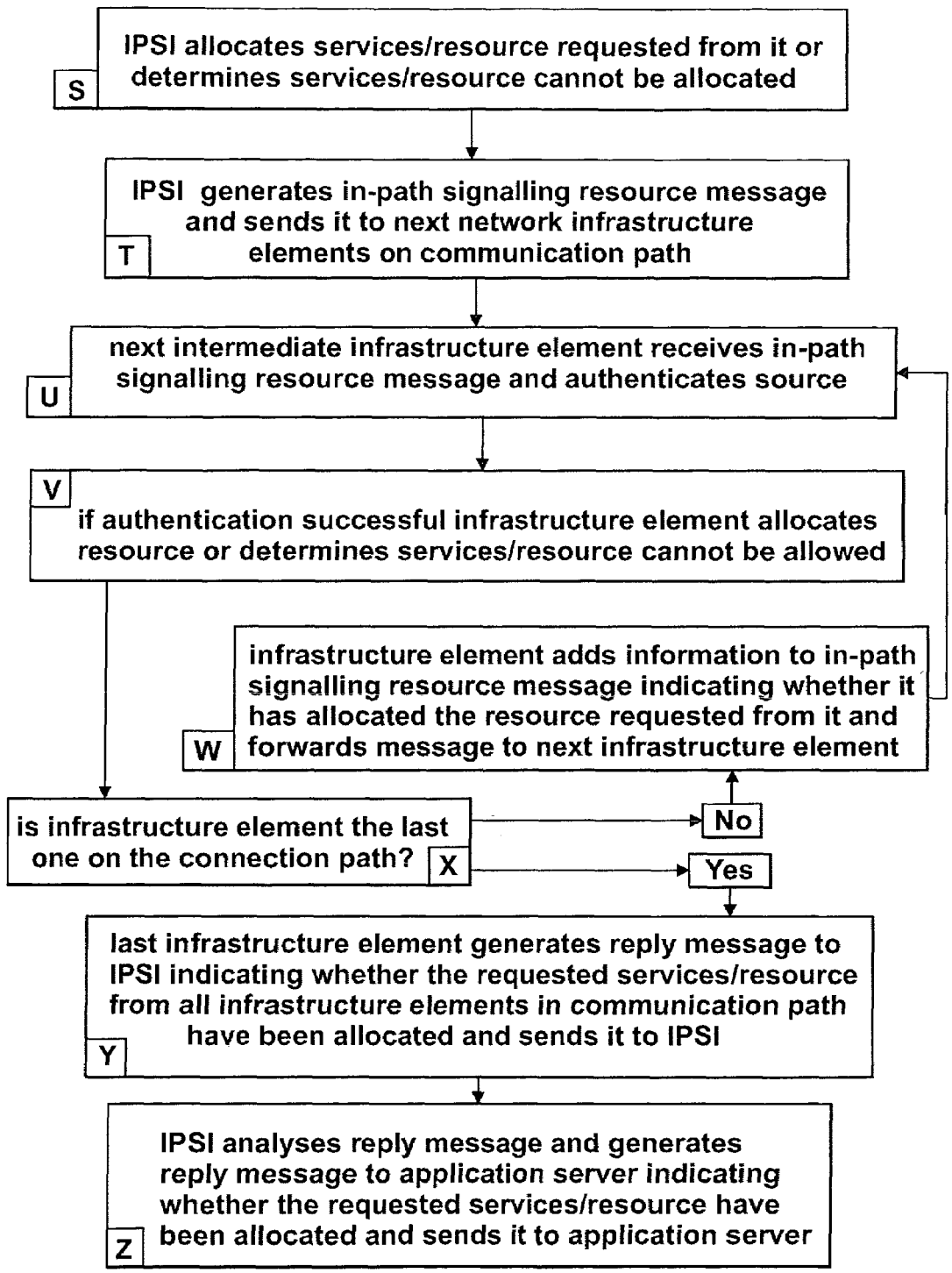
FIG. 5 shows a block diagram representing the steps by which in-path signaling is carried out in the unified network of FIG. 3.

The IPSI sends the in-path signaling resource allocation message to the next network infrastructure element on the connection path (12), which in the example shown in FIG. 3 is the infrastructure element (8) [Box T of FIG. 5]. The in-path signaling resource message will include requests for network services and/or resource from the infrastructure elements (8, 10) along the communication path (12) and identification of the VoIP call agent (26) initiating the request. The infrastructure element (8, 10) in the communication path (12) include means, for example an installed application (32) for supporting the in-path signaling initiated by the IPSI (6) along the entire communication path to the initiating intelligent gateway (4).

The next infrastructure element (8) on receiving the in-path signaling resource allocation message, will authenticate the VoIP call agent (26) [Box U of FIG. 5] and if the authentication is successful, will allocate the requested network services and/or resources to the call, or determine that the requested network services cannot be allocated [Box V of FIG. 5]. As the infrastructure element (8) is not the last one along the communication path (12) [Box X of FIG. 5 via 'No' Box] it adds the information about whether it can allocate the requested services and/or resource to the in-path signaling resource message and forwards the message to the next infrastructure element (10) on the communication path (12) [Box W of FIG. 5]. The infrastructure element (10) is the last infrastructure element on the communication path, ie. the closest infrastructure element to the intelligent gateway (4). The infrastructure element (10) on receiving the in-path signaling resource allocation message from the infrastructure element (8), will authenticate the VoIP call agent (26) [Box U of FIG. 5] and if the authentication is successful, will allocate the requested network services and/or resources to the call, or determine that the requested network services cannot be allocated [Box V of FIG. 5]. As the infrastructure element (10) is the last infrastructure element [Box X of FIG. 5 via 'Yes' Box] it generates a reply message which it sends back to the IPSI (6) indicating whether the network services and/or resources requested from the network infrastructure elements (8, 10) along the communication path (12) have been allocated or not [Box Y of FIG. 5]. When the IPSI (6) receives the reply it will send a message to the VoIP call agent (26) notifying it whether the requested network services and/or resources have been allocated for the call [Box Z of FIG. 5] and, if the resources have been allocated, the call will proceed.

Thus, in-path signaling is performed by the IPSI (6) and not by the application aware device (2) which means that no additional software needs to be installed on the device (2) to support in-path signaling. The in-path signaling is triggered by an application server or proxy, the VoIP call agent (26), located off the communication path (12). The in-path signaling is initiated by the IPSI (6), the closest network infrastructure element to the application aware device (2) which is located in the communication path (12) and which supports in-path signaling. By using in-path signaling, it is ensured that the network services and/or resources are requested from infrastructure elements that lie in the communication path (12). Therefore, the present invention overcomes the problems associated with known in-path signaling and off-path signaling schemes.

The invention claimed is:

1. An in-path signaling method for use in a communication network for establishing a communication path between a first terminal device and a second terminal device via a plurality of in-path network infrastructure elements of the network, the method comprising the steps of:
   a) a service element of the network located off the communication path triggering a network infrastructure element in the communication path between the first terminal device and the second terminal device, said network infrastructure element being the closest network infrastructure element to the second terminal device in the communication path by sending a signaling message to the second terminal device; and
   the closest in-path infrastructure element to the second terminal device intercepting the signaling message, the closest in-path infrastructure element having knowledge of all terminal devices for which it is the closest infrastructure element in the communication network;
   b) the triggered in-path network infrastructure element generating an in-path signaling resource message and sending it to a next infrastructure element along the communication path; and
   c) step b) being repeated between said next and any further infrastructure element until a last such infrastructure element on the communications path receives an in-path signaling resource message from a last but one such infrastructure element, the last such infrastructure element having knowledge of all terminal devices for which it is the closest infrastructure element in the communication network;
   whereby in-path signaling is performed by the in-path network infrastructure element closest to the second terminal device and not by the second terminal device.

2. An in-path signaling method according to claim 1 wherein the communication path is established between the first terminal element located in a first sub-network of a unified network and the second terminal element located in a second sub-network of the unified network.

3. An in-path signaling method according to claim 1 wherein a triggering message sent by the service element to the infrastructure element closest to the second terminal device contains the identification of the service element and the step of the triggered in-path network infrastructure element generating an in-path signaling resource message and sending it along the communication path comprises the steps of:
   the triggered in-path infrastructure element authenticating the service element identification, and
   if the authentication is successful, generating said in-path signaling resource message and sending it along the communication path to a next infrastructure element on the communications path.

4. An in-path signaling method according to claim 1 wherein the network is a unified communication network comprising a public network interfaced with at least one private network.

5. An in-path signaling method according to claim 1 wherein the network infrastructure elements are any of switches and routers on which is installed network service applications.

6. An in-path signaling method according to claim 1 wherein the network infrastructure element are any of switches and routers on which is installed an in-path signaling application.

7. An in-path signaling method according to claim 1 comprising the step of the service element providing a communication service to one or more network terminal devices of the network.

8. A communication network comprising:
   a plurality of network infrastructure elements for establishing a communication path across the network between a first terminal device and a second terminal device, which infrastructure elements each comprise means for generating an in-path signaling resource message and sending it along the communication path and each having knowledge of all terminal devices for which each such infrastructure element is the closest infrastructure element in the communication network; and
   a service element of the network located off the communication path for triggering a network infrastructure element in the communication path between the first terminal device and the second terminal device said network infrastructure element being the closest network infrastructure element to the second terminal device in the communication path to initiate in-path signaling along the communication path by sending a signaling, message to the second terminal device;
   wherein the closest in-path infrastructure element to the second terminal device is triggered by intercepting the signaling message sent by the service element to the second terminal device, the triggered in-path network infrastructure element is arranged to generate an in-path signaling resource message and to send it to a next infrastructure element along the communication path; and said next and any further infrastructure elements are arranged to repeat the generating and sending steps until a last such infrastructure element on the communications path receives an in-path signaling resource message from a last but one such infrastructure element; and whereby in-path signaling is performed by the in-path network infrastructure element closest to the second terminal device and not by the second terminal devices.

9. A network according to claim 8 which is a unified network comprising a plurality of sub-networks and a plurality of terminal elements wherein the communication path is established between the first terminal element located in a first sub-network and the second terminal element located in a second sub-network.

10. A network according to claim 8 wherein the service element is arranged to send a signaling message to the network second terminal device if the first and second terminal devices which terminates the communication path, which message identifies the service element, and the in-path infrastructure element has means for intercepting the signaling message, authenticating the service element identification, and if the authentication is successful, generating an in-path signaling resource message and sending it along the communication path to a next infrastructure element on the communications path.

11. A network according to claim 8 which is a unified network comprising a public network interfaced with at least one private network.

12. A network according to claim 8 wherein the network infrastructure elements are any of switches and routers on which is installed network service applications.

13. A network according to claim 8 wherein the network infrastructure element are any of switches and routers on which is installed an in-path signaling application.

14. A network according to claim 8 wherein the service element is arranged to provide a communication service to one or more terminal elements of the network.

15. Computer readable media for installation on a network infrastructure element of a communication network in which a communication path is established between a first terminal device and a second terminal device, said a network infrastructure element in the communication path between the first terminal device and the second terminal device, said network infrastructure element being the closest network infrastructure element to the second terminal device in the communication path and having knowledge of all terminal devices for which it is the closest infrastructure element in the communication network, the computer readable media comprising computer readable instructions for carrying out the following operations at said infrastructure element:

intercepting from a service element of the network located off the communication path a triggering message relating to the communication path to be established sequentially by the infrastructure element in concert with other infrastructure elements in the communications path, wherein said network infrastructure element intercepts the triggering message from the service element to a second terminal device which terminates the communication if said network infrastructure element is the closest such infrastructure element to said second terminal device; and in response to the triggering message, generating an in-path signaling resource message and sending it along the communication path to a next one of said other infrastructure elements on the communication path; and wherein the computer readable instructions arrange the in-path network infrastructure element closest to the second terminal device and not the second terminal device itself to perform the in-path signaling.

16. Computer readable media according to claim 15 for installation on a network infrastructure element of a unified communication network in which the communication path is established between the first terminal element located in a first sub-network and the second terminal element located in a second sub-network.

17. Computer readable media according to claim 15 for carrying out the steps of:

intercepting a triggering message from the service element of the network which message identifies the service element;

analyzing the triggering message to authenticate the service element identification, and if the authentication is successful, generating an in-path signaling resource message and sending it along the communication path to a next infrastructure element on the communications path.

18. Computer readable media according to claim 15 for installation on a network infrastructure element of a unified communication network which unified communication network comprises a public network interfaced with at least one private network.

19. A network infrastructure element of a communication network for establishing a communication path between a first terminal device and a second terminal device across the network, said infrastructure element being the closest such element to said second terminal device and having knowledge of all terminal devices for which it is the closest infrastructure element in the communication network, the infrastructure element comprising:

means for intercepting a triggering message from a service element of the network located off the communication path, said message relating to the communications path to be established sequentially by said infrastructure element in concert with other infrastructure elements in the communications path, wherein said means for intercepting is arranged to intercept the triggering message, a network infrastructure element in the communication path between the first terminal device and the second terminal device, said network infrastructure element being the closest network infrastructure element to the second terminal device in the communication path;

means responsive to the triggering message for generating an in-path signaling resource message and sending it along the communication path to a next infrastructure element in the communications path;

wherein the network infrastructure element is arranged to perform the in-path signaling instead of the second terminal device.

20. A network infrastructure element according to claim 19 comprising a unified network, which network comprises a plurality of sub-networks and a plurality of terminal elements in which the communication path established by the network infrastructure element is between the first terminal element located in a first sub-network and the second terminal element located in a second sub-network.

21. A network infrastructure element according to claim 19, wherein the triggering message includes a request for services and/or resource from the infrastructure element and the infrastructure element additionally includes:

means for determining whether it has the requested services and/or resource available; and means for allocating the requested services and/or resource which is available to the communication path.

22. A network infrastructure element according to claim 19 wherein the communication path terminates at the second terminal device.

23. A network infrastructure element according to claim 19 wherein the network infrastructure element includes means for authenticating the service element sending the triggering message.

* * * * *